T. J. WEST.
Fertilizer.
No. 100,573. Patented March 8, 1870.
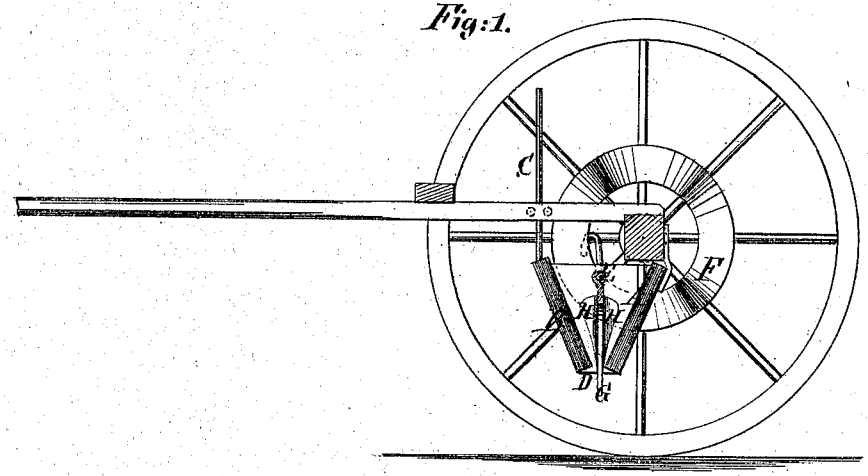
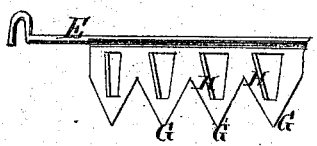
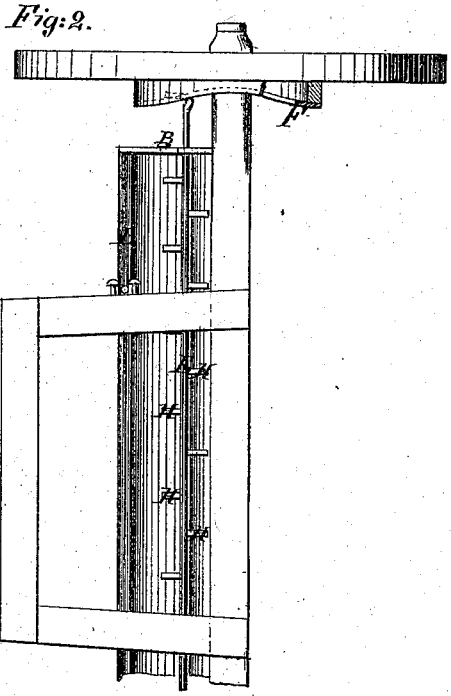

United States Patent Office.

THOMAS J. WEST, OF ALFRED CENTRE, ASSIGNOR TO HIMSELF, JOHN L. RUSSELL, AND ABRAM C. FRISBY, OF SAME PLACE, AND JOEL MOREKESS, OF ANDOVER, NEW YORK.

Letters Patent No. 100,573, dated March 8, 1870.

IMPROVEMENT IN FERTILIZER-SOWER.

The Schedule referred to in these Letters Patent and making part of the same.

*To all whom it may concern:*

Be it known that I, THOMAS J. WEST, of Alfred Centre, in the county of Allegany, and State of New York, have invented a new and improved Fertilizer-Sower; and I do hereby declare that the following is a full, clear, and exact description thereof, which will enable others skilled in the art to make and use the same, reference being had to the accompanying drawings forming part of this specification.

This invention relates to improvements in machines for sowing plaster, lime, ashes, manure, and all other fertilizing substances, and consists in an arrangement on an axle mounted on wheels and provided with a tongue or other means for hitching horses, of a long V-shaped trough, with a longitudinal opening at the bottom, and having one side arranged on pivots to be oscillated for widening or narrowing the opening, in which trough is placed a reciprocating rod actuated by cams on one of the wheels, and provided with pointed or saw-tooth-shaped agitators projecting downward through the discharge opening, and provided with flanges projecting from the sides, by which the lumps and clods of the fertilizing substance will be pulverized and caused to feed uniformly through the discharge opening.

Figure 1 is a longitudinal sectional elevation of my improved fertilizer-sowing apparatus.

Figure 2 is a plan view of the same.

Figure 3 is a detail view of the agitator.

Similar letters of reference indicate corresponding parts.

A is the long trough or hopper, with oblique sides, one of which is placed on pivots B, at the end, and provided with an oscillating lever, C, for turning it to widen or narrow the passage D for varying the amount of fertilizing substance discharged.

E is the reciprocating rod, traversing the trough near the top, and actuated by a cam-shaped bar, F, attached to one of the wheels, and to which the said rod is connected by a looped or bent end, doubling around the inner edge, so as to bear against both sides to be moved forward and back by it.

This bar is armed with pointed or saw-shaped agitators, G, projecting downward through the slot or opening, D, to crush and pulverize the clods and lumps and to insure a regular feeding of the substance placed in the trough.

These points are armed with the lateral flanges H, which increase their capacity to agitate and pulverize the fertilizing substance.

These points may be made of sheet metal, either separately or in connection, and the lateral flanges H may be formed by punching the points and bending parts thereof up therefrom, leaving one side adhering to the said points.

This machine will be found very useful for sowing and distributing fertilizing substances, which are all liable to form into clods, cakes, or lumps by exposure to wet and to the action of the atmosphere, and required to be pulverized at the time of distributing in order to give the best results, as is well understood.

Having thus described my invention,

I claim as new, and desire to secure by Letters Patent—

The combination of the distributing-trough mounted on wheels, and having a variable discharge-opening along the bottom of the reciprocating agitators G, arranged as described, and either provided with the flanges H or not, all substantially as specified.

T. J. WEST.

Witnesses:
WM. POTTER, Jr.,
L. D. COLLINS.